(12) United States Patent
Yasuda et al.

(10) Patent No.: US 10,781,004 B2
(45) Date of Patent: Sep. 22, 2020

(54) BAG MAKING AND PACKAGING MACHINE

(71) Applicant: ISHIDA CO., LTD., Kyoto-shi, Kyoto (JP)

(72) Inventors: Takahiro Yasuda, Ritto (JP); Makoto Ichikawa, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 441 days.

(21) Appl. No.: 15/110,821

(22) PCT Filed: Dec. 8, 2014

(86) PCT No.: PCT/JP2014/082450
§ 371 (c)(1),
(2) Date: Jul. 11, 2016

(87) PCT Pub. No.: WO2015/107799
PCT Pub. Date: Jul. 23, 2015

(65) Prior Publication Data
US 2016/0332755 A1  Nov. 17, 2016

(30) Foreign Application Priority Data

Jan. 20, 2014 (JP) ................. 2014-007890

(51) Int. Cl.
*B65B 9/207* (2012.01)
*B29C 65/18* (2006.01)
(Continued)

(52) U.S. Cl.
CPC ............. *B65B 9/207* (2013.01); *B29C 65/18* (2013.01); *B29C 65/305* (2013.01);
(Continued)

(58) Field of Classification Search
CPC ......... B65B 9/207; B65B 61/06; B65B 51/30; B65B 57/10; B65B 57/02; B65B 51/306;
(Continued)

(56) References Cited

U.S. PATENT DOCUMENTS 3,525,193 A    8/1970  Cutler et al.
3,850,780 A *  11/1974 Crawford .................. B26F 3/06
                                                      156/583.4
(Continued)

FOREIGN PATENT DOCUMENTS

EP    1050469 A1   11/2000
EP    1712474 A1   10/2006
(Continued)

OTHER PUBLICATIONS

Partial European Search Report of the corresponding European Application No. 14878929.0, dated Feb. 7, 2017.
(Continued)

*Primary Examiner* — Thanh K Truong
*Assistant Examiner* — Katie L Gerth
(74) *Attorney, Agent, or Firm* — Global IP Counselors, LLP

(57) ABSTRACT

A bag making and packaging machine includes a cutter fixed to a sealing member that cuts a laterally sealed portion of a film using pressure force with which a pair of sealing members sandwiches the film during lateral sealing. The bag making and packaging machine further includes a pair of sealing jaws, a knife, a pressurization mechanism, and a pressurization mechanism control part. The knife fixed to one sealing jaw, fusion-cuts the laterally sealed portion of the film. The pressurization mechanism exerts pressure force on one sealing jaw towards the other sealing jaw so that the pair of sealing jaws sandwiches and laterally seals the film therebetween, and the knife comes into contact with a laterally sealed portion and fusion-cuts the laterally sealed portion. The pressurization mechanism control part causes the pressurization mechanism to cease exerting pressure force based on error information pertaining to the film or the goods.

5 Claims, 9 Drawing Sheets

(51) Int. Cl.
| | |
|---|---|
| *B29C 65/74* | (2006.01) |
| *B29C 65/00* | (2006.01) |
| *B29C 65/30* | (2006.01) |
| *B65B 61/10* | (2006.01) |
| *B65B 51/30* | (2006.01) |
| *B65B 57/10* | (2006.01) |
| *B65B 57/02* | (2006.01) |
| *B65B 59/02* | (2006.01) |
| *B65B 61/06* | (2006.01) |
| *B65B 9/20* | (2012.01) |
| *B29L 31/00* | (2006.01) |

(52) U.S. Cl.
CPC ........ *B29C 65/743* (2013.01); *B29C 66/1122* (2013.01); *B29C 66/4312* (2013.01); *B29C 66/7373* (2013.01); *B29C 66/81422* (2013.01); *B29C 66/81427* (2013.01); *B29C 66/81435* (2013.01); *B29C 66/8242* (2013.01); *B29C 66/83513* (2013.01); *B29C 66/8491* (2013.01); *B29C 66/872* (2013.01); *B29C 66/92441* (2013.01); *B65B 9/2014* (2013.01); *B65B 51/30* (2013.01); *B65B 51/306* (2013.01); *B65B 57/02* (2013.01); *B65B 57/10* (2013.01); *B65B 59/02* (2013.01); *B65B 61/06* (2013.01); *B65B 61/10* (2013.01); *B29C 66/8746* (2013.01); *B29C 66/87443* (2013.01); *B29C 66/9672* (2013.01); *B29L 2031/712* (2013.01); *B29L 2031/7128* (2013.01)

(58) Field of Classification Search
CPC ........ B65B 61/08; B65B 61/10; B65B 59/02; B65B 9/2014; B29C 66/1122; B29C 66/4312; B29C 66/92441; B29C 66/8491; B29C 66/7373; B29C 65/305; B29C 66/872; B29C 66/83513; B29C 66/8242; B29C 66/81435; B29C 66/81427; B29C 66/81422; B29C 65/18; B29C 65/743; B29C 66/9672; B29C 66/8746; B29C 66/87443; B29L 2031/712; B29L 2031/7128
USPC .............................. 53/75, 552, 551
See application file for complete search history.

(56) References Cited

U.S. PATENT DOCUMENTS

| | | | | |
|---|---|---|---|---|
| 3,986,921 A * | 10/1976 | Putnam, Jr. | ............ | B29C 65/18 156/583.1 |
| 4,254,601 A * | 3/1981 | Prager | .................... | B29C 65/18 156/510 |
| 5,315,807 A * | 5/1994 | Restle | ..................... | B26D 5/32 493/9 |
| 6,178,726 B1 * | 1/2001 | Takigawa | ................ | B29C 65/18 53/451 |
| 6,505,664 B1 * | 1/2003 | Blundell | .............. | B26D 7/2628 156/251 |
| 6,711,874 B1 * | 3/2004 | Nakagawa | .............. | B29C 65/02 53/502 |
| 6,725,625 B1 * | 4/2004 | Honma | ................... | B29C 65/02 53/64 |
| 6,732,496 B1 * | 5/2004 | Wessman | ............ | B29C 65/3656 53/451 |
| 2002/0007659 A1 * | 1/2002 | Bennett | .................... | G01V 3/10 73/1.01 |
| 2004/0065047 A1 * | 4/2004 | Miyamoto | ......... | B65H 19/1852 53/64 |
| 2005/0198920 A1 * | 9/2005 | Nakagawa | ................ | B65B 9/00 53/64 |
| 2006/0229180 A1 * | 10/2006 | Hashimoto | ........... | B65B 51/306 493/287 |
| 2007/0062158 A1 * | 3/2007 | Boldrini | ................ | B29C 65/081 53/374.6 |
| 2007/0199279 A1 * | 8/2007 | Vezzani | ............... | B29C 65/7451 53/374.5 |
| 2009/0313944 A1 * | 12/2009 | Ghiotti | ................ | B29C 65/7443 53/374.4 |
| 2011/0107729 A1 * | 5/2011 | Miyazaki | ................ | B29C 65/18 53/562 |
| 2011/0131935 A1 * | 6/2011 | Kondo | ................... | B65B 9/2028 53/576 |
| 2012/0012258 A1 * | 1/2012 | Vogler | .................. | B29C 65/087 156/510 |
| 2012/0285130 A1 * | 11/2012 | Kamigaito | .......... | B29C 66/1122 53/548 |
| 2012/0311975 A1 * | 12/2012 | Kamigaito | .............. | B29C 65/08 53/548 |

FOREIGN PATENT DOCUMENTS

| | | | |
|---|---|---|---|
| JP | 2002-104327 A | 4/2002 | |
| JP | 2004-352287 A | 12/2004 | |
| JP | 2005-075401 A | 3/2005 | |
| JP | 2006-036328 A | 2/2006 | |
| JP | 2006-232384 A | 9/2006 | |
| JP | 2006290403 A * | 10/2006 | ........... B65B 51/306 |

OTHER PUBLICATIONS

Translation of the Written Opinion of the International Searching Authority, dated Aug. 4, 2016.
Extended European Search Report of the corresponding European Patent Application No. 14878929.0, dated May 23, 2017.

* cited by examiner

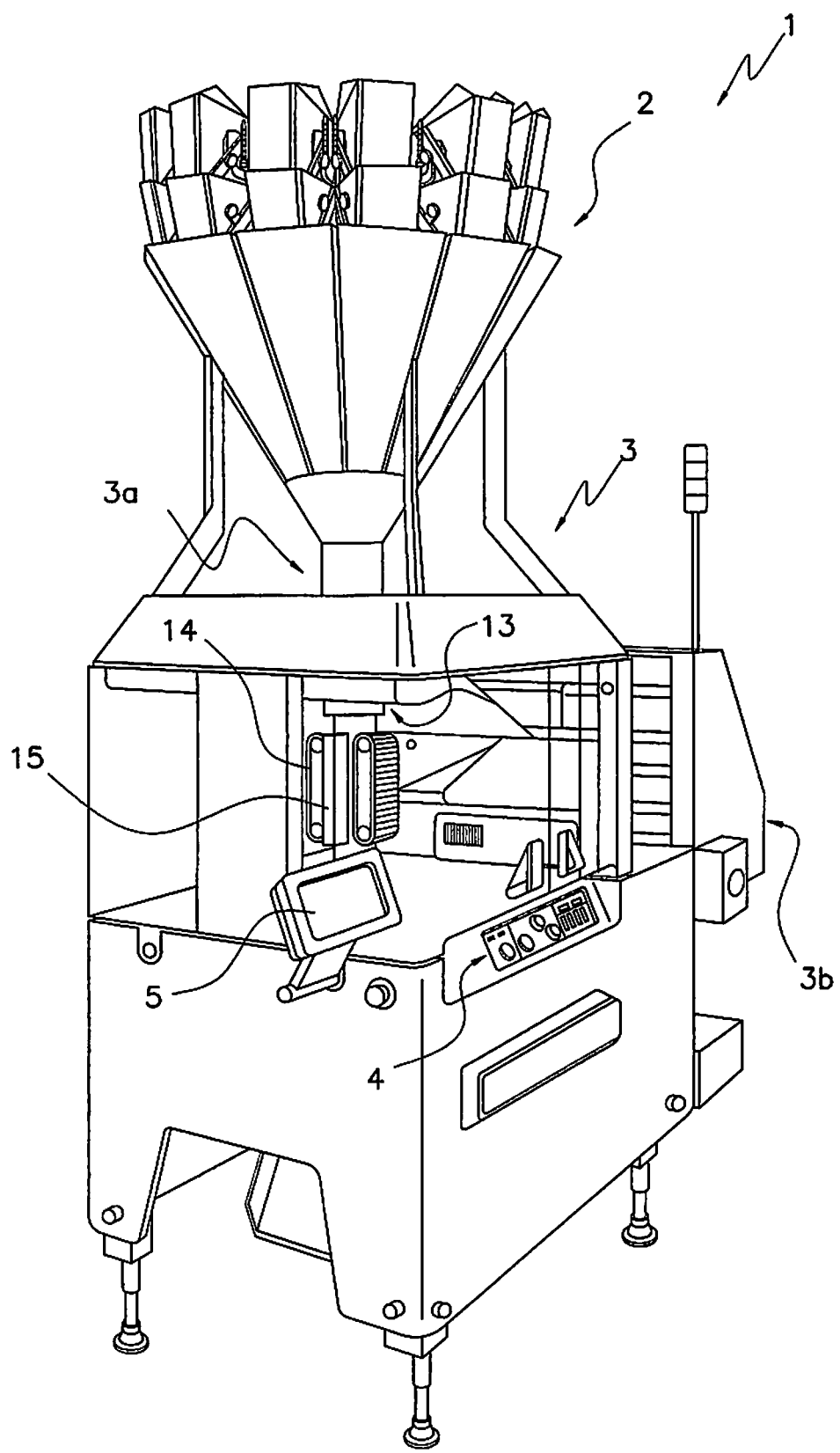
F I G. 1

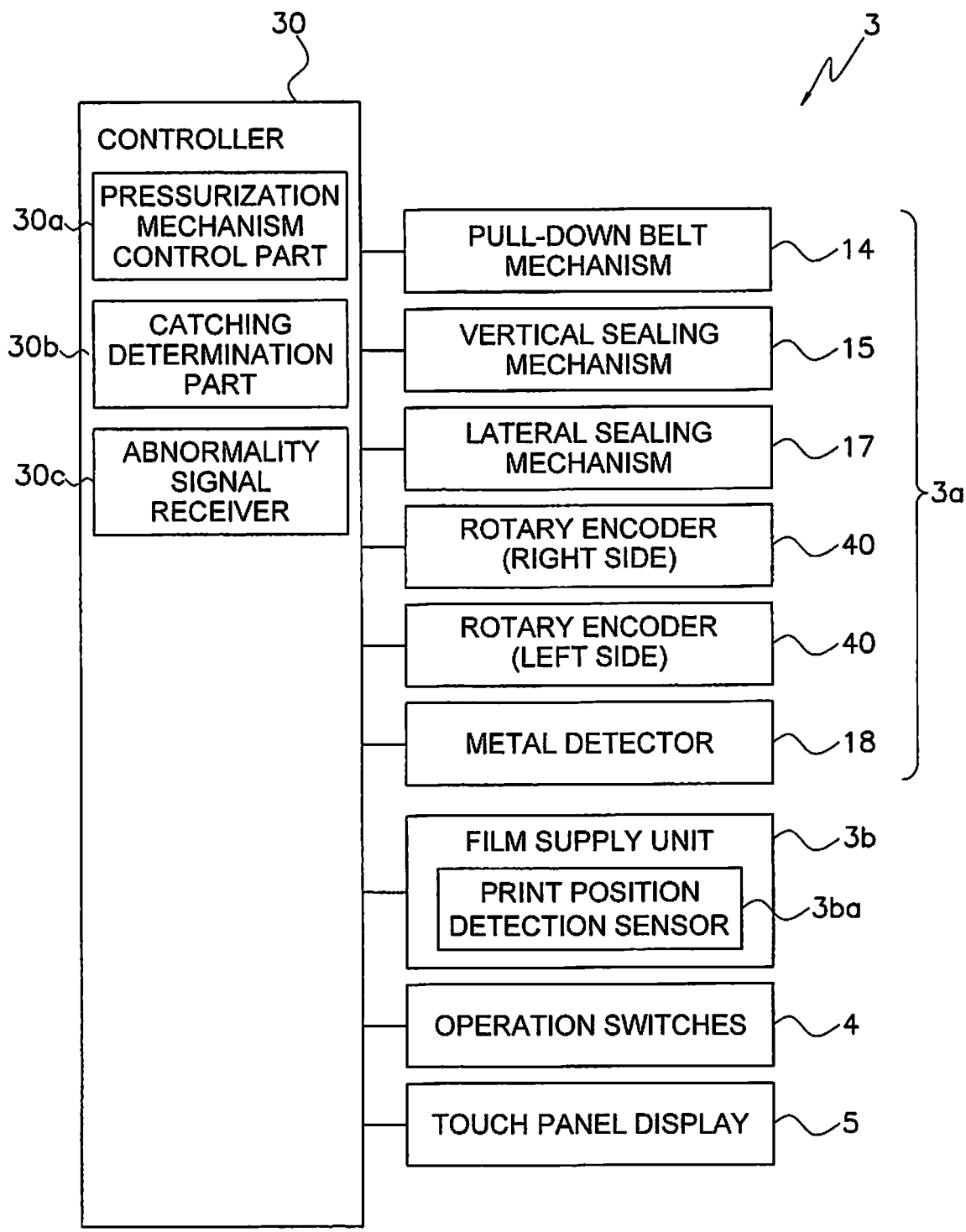
F I G. 2

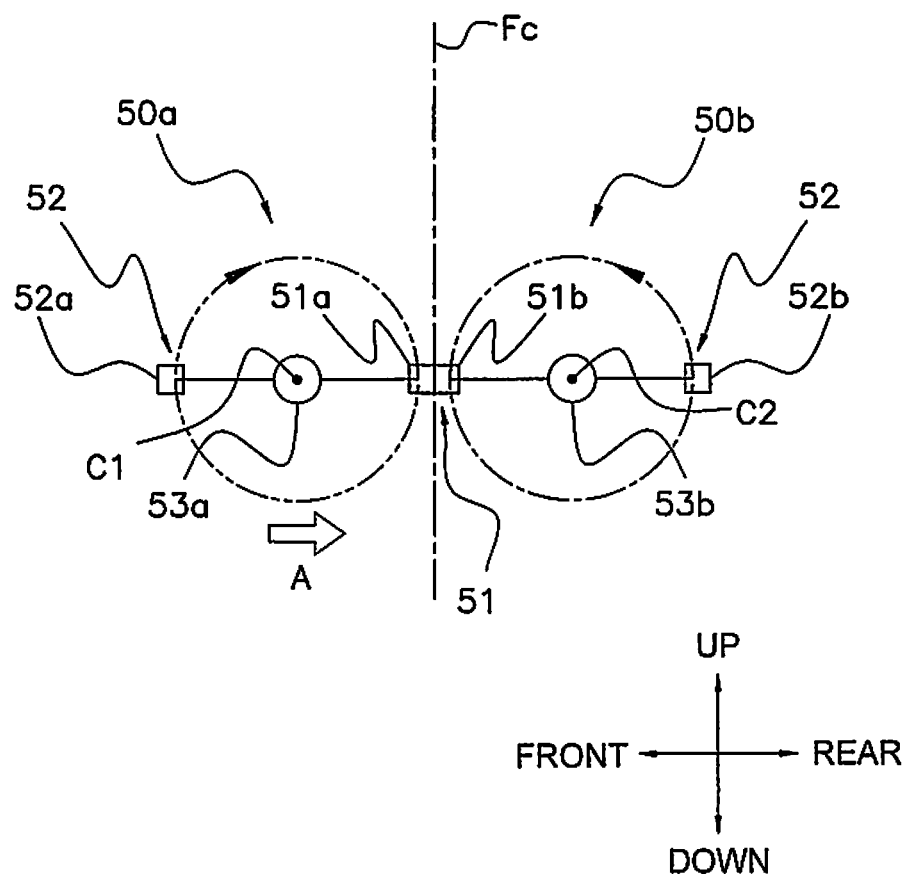
F I G. 5

BAG MAKING AND PACKAGING MACHINE

CROSS-REFERENCE TO RELATED APPLICATIONS

This U.S. National stage application of PCT/JP2014/082450 claims priority under 35 U.S.C. § 119(a) to Japanese Patent Application No. 2014-007890, filed in Japan on Jan. 20, 2014, the entire contents of which are hereby incorporated herein by reference.

TECHNICAL FIELD

The present invention relates to a bag making and packaging machine.

BACKGROUND ART

In the past, there have been bag making and packaging machines in which a sealed portion of a film is sandwiched and laterally sealed by a pair of sealing members, and bags are separated by cutting the laterally sealed portion using a cutter driven by an air cylinder or another drive part (for example, Patent Literature 1 (Japanese Laid-open Patent Application No. 2002-104327)).

In such a bag making and packaging machine, when a certain bag has an abnormality, the bag with the abnormality can be discharged as a continuous package by controlling the drive part for driving the cutter. The term "discharged as a continuous package" means that without cutting bags apart, two or more bags are discharged from the bag making and packaging machine while remaining joined. Discharging bags with abnormalities as a continuous package makes it possible to easily discern between bags with abnormalities and bags without abnormalities.

DISCLOSURE OF THE INVENTION

Technical Problem

By contrast, there is a bag making and packaging machine that does not have a drive part for driving only a cutter. In such a bag making and packaging machine, the bags are separated by means of a cutter fixed to the sealing members by utilizing pressure force for sandwiching the film when a pair of sealing members is laterally sealing the film. In such a bag making and packaging machine, because the movement of the cutter cannot be controlled, the bags with abnormalities cannot be discharged as a continuous package when there are any bags with abnormalities. Therefore, another machine is required to discern bags with abnormalities in the latter stage of the bag making and packaging machine, and the production system having the bag making and packaging machine becomes overall more complicated and more expensive.

It is an object of the present invention to provide a bag making and packaging machine in which a laterally sealed portion is cut with a cutter fixed to sealing members, using pressure force with which a pair of sealing members sandwiches a film during lateral sealing, in order to separate bags, wherein the bags can be discharged as a continuous package.

Solution to Problem

The bag making and packaging machine according to the present invention is configured to produce bags from a film and package packaged articles inside the bags. The bag making and packaging machine is provided with a pair of sealing members, a fusion cutting member, a pressurization mechanism, and a control part. The pair of sealing members is configured to laterally seal the film. The fusion cutting member, which is fixed to one of the sealing members, is configured to fusion-cut a laterally sealed portion of the film. The pressurization mechanism is configured to exert pressure force on one of the sealing members towards the other of the sealing members so that the pair of sealing members sandwiches and laterally seals the film therebetween, and the fusion cutting member comes into contact with the laterally sealed portion and fusion-cuts the laterally sealed portion. The control part is configured to cause the pressurization mechanism to cease exerting pressure force based on error information pertaining to the film or the packaged articles.

In this aspect, the exertion of pressure force on the sealing members by the pressurization mechanism, which serves as a drive force for the fusion cutting of the fusion cutting member, is ceased based on the error information pertaining to the film or the packaged articles. Therefore, bags with abnormalities in the film (i.e., in the bags themselves) or in the packaged articles can be discharged as a continuous package from the bag making and packaging machine. As a result, bags with abnormalities can be easily discerned among the bags discharged from the bag making and packaging machine.

In the bag making and packaging machine according to the present invention, it is preferable that the sealing members are configured to laterally seal the film and the fusion cutting member is configured not to fusion-cut the laterally sealed portion when the control part causes the pressurization mechanism to cease exerting pressure force.

In this aspect, because the laterally sealed portion is not fusion-cut when the pressurization mechanism ceases to exert pressure force, bags with abnormalities can be discharged as a continuous package from the bag making and packaging machine.

Particularly, in this aspect, when the pressurization mechanism ceases to exert pressure force, the pressure between the sealing members is not reduced so much that the film would not be laterally sealed. It is therefore possible to quickly switch between a state in which the fusion cutting member cuts the laterally sealed portion of the film and the bags are discharged as a continuous package, and a state in which the fusion cutting member cuts the laterally sealed portion of the film in order to separate the bags.

In the bag making and packaging machine according to the present invention, it is preferable that the pressurization mechanism includes an air cylinder having a cylinder tube to which compressed air is to be supplied. The control part preferably is configured to cause the pressurization mechanism to cease exerting pressure force by opening the cylinder tube to the atmosphere.

In this aspect, it is possible to make the pressurization mechanism cease exerting pressure force in a short amount of time by opening the cylinder tube to the atmosphere. Therefore, when the processing speed of the bag making and packaging machine is relatively high (a relatively large number of bags are packaged per unit time), bags with abnormalities in the film (i.e., in the bags themselves) or in the packaged articles are easily discharged as a continuous package from the bag making and packaging machine.

In the bag making and packaging machine according to the present invention, it is preferable that the error information includes information pertaining to at least one of the following: weight errors in the packaged articles, metal-mixing errors in the packaged articles, catching errors during lateral sealing of the film, print position errors on the film, and abnormality errors in supplying of the film.

In this aspect, bags with abnormalities can be discharged as a continuous package from the bag making and packaging machine when errors such as those described above have occurred in the film or the packaged articles.

The bag making and packaging machine according to the present invention is preferably provided with an error information receiver configured to receive the error information.

Bags with abnormalities can thereby be discharged as a continuous package from the bag making and packaging machine based on the information from various machines other than the bag making and packaging machine.

The bag making and packaging machine according to the present invention is preferably provided with an error information detector configured to detect the error information.

Various abnormalities can thereby be detected, and bags with abnormalities can be discharged as a continuous package from the bag making and packaging machine.

Advantageous Effects of Invention

In the bag making and packaging machine according to the present invention, the exertion of pressure force on the sealing members by the pressurization mechanism, which serves as a drive force for the fusion cutting of the fusion cutting member, is ceased based on the error information pertaining to the film or the packaged articles. Therefore, bags with abnormalities in the film (i.e., in the bags themselves) or in the packaged articles can be discharged as a continuous package from the bag making and packaging machine. As a result, bags with abnormalities can be easily discerned among the bags discharged from the bag making and packaging machine.

BRIEF DESCRIPTION OF THE DRAWINGS

FIG. 1 is a perspective view of a weighing/packaging apparatus including the bag making and packaging machine according to an embodiment of the present invention.

FIG. 2 is a block diagram of the bag making and packaging machine according to FIG. 1.

FIG. 5 is a side view, as seen from the right direction in FIG. 3, of the trajectories of the sealing jaws of the lateral sealing mechanism according to FIG. 4.

DESCRIPTION OF EMBODIMENTS

Figure 3:
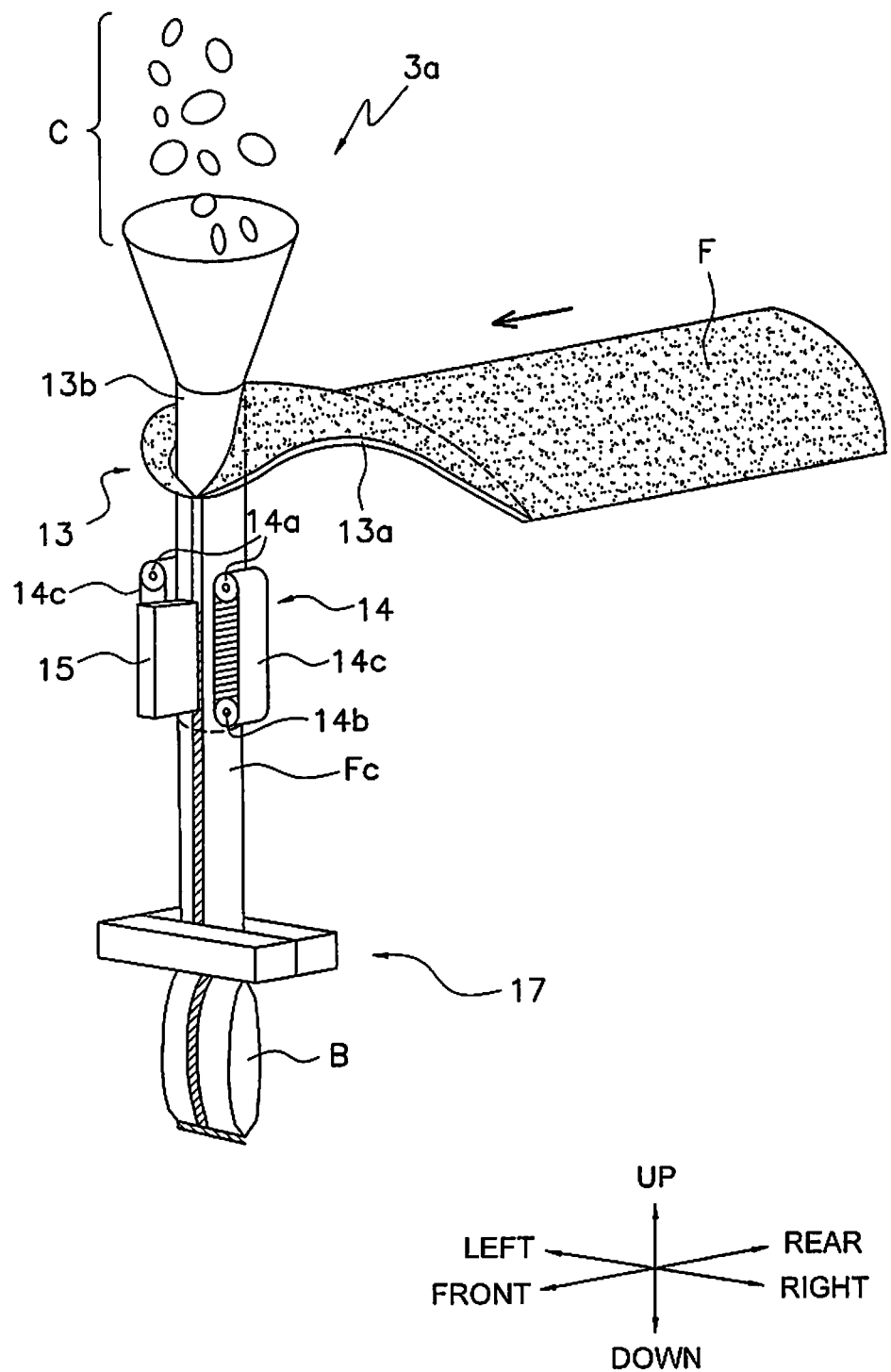
FIG. 3 is a perspective view showing the simplified configuration of the bag making and packaging unit of the bag making and packaging machine according to FIG. 1.

An embodiment of the bag making and packaging machine according to the present invention is described with reference to the drawings below. The following embodiment, which is a specific example of the present invention, does not limit the technical range of the present invention.

(1) Overall Configuration

FIG. 1 is a perspective view of a weighing/packaging apparatus 1 including a bag making and packaging machine 3 according to an embodiment of the present invention. FIG. 2 is a block diagram of the bag making and packaging machine 3.

The weighing/packaging apparatus 1 has primarily a combination weighing machine 2 and a bag making and packaging machine 3 (see FIG. 1). The bag making and packaging machine 3 has primarily a bag making and packaging unit 3a, a film supply unit 3b, and a controller 30 (see FIG. 2).

The combination weighing machine 2 is disposed above the bag making and packaging unit 3a of the bag making and packaging machine 3. In the combination weighing machine 2, the weight of goods C (the packaged articles of the bag making and packaging machine 3) is weighed by a plurality of weighing hoppers, and a combination of weighing hoppers is selected so that the total of these weighed values falls within a predetermined weight range. The goods C in the selected weighing hoppers are discharged from the combination weighing machine 2 to the bag making and packaging unit 3a disposed below.

There are sometimes cases in which goods C of a weight outside of the predetermined weight range are discharged from the combination weighing machine 2 into the bag making and packaging unit 3a. Such situations occur when, for example, the total of the weighed values exceeds the predetermined weight range for all combinations generated by combining the goods C in any of the weighing hoppers in the combination weighing machine 2. When goods C of a weight outside of the predetermined weight range are discharged from the combination weighing machine 2 into the bag making and packaging unit 3a, a signal informing of the weight error of the goods C is transmitted from a controller (not shown) of the combination weighing machine 2 to the controller 30 of the bag making and packaging machine 3.

The bag making and packaging unit 3a of the bag making and packaging machine 3 produces bags B and packages goods C inside the bags B in accordance with the timing at which goods C are supplied from the combination weighing machine 2. The film supply unit 3b of the bag making and packaging machine 3 supplies the bag making and packaging unit 3a with a film F for producing the bags B.

The weighing/packaging apparatus 1 is provided with operation switches 4 for operating the combination weighing machine 2 and the bag making and packaging machine 3. The weighing/packaging apparatus 1 is also provided with a touch panel display 5 for displaying the operating states of the combination weighing machine 2 and the bag making and packaging machine 3, and receiving various setting inputs and the like concerning the combination weighing machine 2 and the bag making and packaging machine 3. The operation switches 4 and the touch panel display 5 are connected to the controller (not shown) of the combination weighing machine 2 and the controller 30 of the bag making and packaging machine 3. The operation switches 4 and the touch panel display 5 function as input parts for receiving commands for the combination weighing machine 2 and the bag making and packaging machine 3, and/or settings pertaining to the combination weighing machine 2 and the bag making and packaging machine 3. The touch panel display 5 functions as an output part for displaying information pertaining to the combination weighing machine 2 and the bag making and packaging machine 3.

In the present embodiment, the operation switches 4 and the touch panel display 5 are commonly used with the combination weighing machine 2 and the bag making and packaging machine 3 but are not limited as such. Operation switches and a touch panel display may be provided to individual machines.

The controller 30 controls the bag making and packaging machine 3 according to the operations and settings inputted from the operation switches 4 and/or the touch panel display 5. The controller 30 controls the bag making and packaging machine 3 using information acquired by various sensors installed in the bag making and packaging machine 3, and/or information received from the controller of the combination weighing machine 2.

(2) Detailed Configuration

The bag making and packaging machine 3 will be described in detail.

In the description below, the expressions "front (front surface)," "rear (back surface)," "up," "down," "left," "right," and the like are sometimes used in order to describe directions and the arrangements of configurations, but in this embodiment, the expressions "front," "rear," "up," "down," "left," and "right" are defined as shown in FIG. 3. When not specified otherwise, the expressions "front (front surface)," "rear (back surface)," "up," "down," "left," "right," and the like are used according to how they are defined in FIG. 3. In the description below, the expressions "upstream" and "downstream" are also sometimes used, and when not specified otherwise, the terms "upstream" and "downstream" are represented by using the conveying direction of the film F as a standard.

(2-1) Bag Making and Packaging Unit

The bag making and packaging unit 3a produces bags B from the film F and packages goods C as packaged articles inside the bags B, in accordance with the timing at which goods C are supplied from the combination weighing machine 2 disposed above.

The bag making and packaging unit 3a has primarily a shaping mechanism 13 (see FIG. 3), a pull-down belt mechanism 14 (see FIG. 3), a vertical sealing mechanism 15 (see FIG. 3), a lateral sealing mechanism 17 (see FIG. 3), rotary encoders 40 (see FIG. 2), and a metal detector 18 (see FIG. 2).

The shaping mechanism 13 shapes the film F, which is conveyed from the film supply unit 3b in sheet form, into a tube. The pull-down belt mechanism 14 downwardly conveys the film F that has formed into a tubular shape (hereinafter called the tubular film Fc). The vertical sealing mechanism 15 vertically seals the overlapping portions (the seams) of the tubular film Fc. The lateral sealing mechanism 17 seals the upper and lower ends of the bag B by sealing (laterally sealing) the downwardly conveyed tubular film Fc along a direction intersecting the conveying direction. The lateral sealing mechanism 17 also uses knives 72a (see FIG. 7) provided to sealing jaws 51b, 52b, described hereinafter, to cut the laterally sealed bag B away from the tubular film Fc. The packaged bag B cut away from the tubular film Fc is discharged from the bottom of the bag making and packaging machine 3. The rotary encoder 40 measures the amount of movement of a first rotating shaft 53a of a first rotating body 50a of the lateral sealing mechanism 17, described hereinafter (the amount of relative movement of the first rotating shaft 53a with respect to a second rotating shaft 53b of a second rotating body 50b of the lateral sealing mechanism 17, described hereinafter). The metal detector 18, which is disposed higher than the upper end of a tube 13b of the shaping mechanism 13, detects whether or not metal is mixed into the goods C supplied to the tube 13b.

The shaping mechanism 13, the pull-down belt mechanism 14, the vertical sealing mechanism 15, the lateral sealing mechanism 17, and the rotary encoder 40 are further described below.

(2-1-1) Shaping Mechanism

The shaping mechanism 13 has a tube 13b and a former 13a.

The tube 13b is a tubular member which opens at the upper and lower ends. The goods C weighed and combined by the combination weighing machine 2 are loaded into the opening in the upper end of the tube 13b.

The former 13a is disposed so as to surround the tube 13b. The film F in sheet form unreeled from a film roll of the film supply unit 3b is shaped into a tube when passing between the former 13a and the tube 13b. The tube 13b and the former 13a of the shaping mechanism 13 can be exchanged depending on the size of the bag B to be produced.

(2-1-2) Pull-Down Belt Mechanism

The pull-down belt mechanism 14 chunks the tubular film Fc that is wound around the tube 13b and continuously conveys the tubular film Fc downwardly. The pull-down belt mechanism 14 has a pair of belts 14c disposed on the left and right sides of the tube 13b so as to sandwich the tube 13b, as shown in FIG. 3. The tubular film Fc is conveyed downward when the belts 14c, which have a chucking function, are driven by a drive roller 14a and a driven roller 14b. FIG. 3 omits to illustrate a roller drive motor for causing the drive roller 14a to rotate.

(2-1-3) Vertical Sealing Mechanism

The vertical sealing mechanism 15 heat-seals the tubular film Fc in the vertical direction (in the up-down direction in FIG. 3).

The vertical sealing mechanism 15 is disposed on the front side of the tube 13b (see FIG. 3). The vertical sealing mechanism 15 is driven in the forward-backward direction by a drive mechanism (not shown) so as to move toward the tube 13b or move away from the tube 13b. When the vertical sealing mechanism 15 is driven by the drive mechanism so as to move toward the tube 13b, the overlapping portions (the seams) of the tubular film Fc wound around the tube 13b is sandwiched between the vertical sealing mechanism 15 and the tube 13b. The vertical sealing mechanism 15 heats the overlapping portions of the tubular film Fc while sandwiching the overlapping portions of the tubular film Fc with the tube 13b in order to heat-seal the overlapping portions of the tubular film Fc.

(2-1-4) Lateral Sealing Mechanism

The lateral sealing mechanism 17, as described hereinafter, uses a pair of sealing jaws 51 (sealing jaw 51a and a sealing jaw 51b) or a pair of sealing jaws 52 (a sealing jaw 52a and a sealing jaw 52b) to sandwich the sealed portion of the tubular film Fc, which is being conveyed downward, along a direction (the left-right direction in this case) intersecting the conveyed direction of the tubular film Fc, and to heat-seal the sealed portion in the lateral direction.

Figure 4:
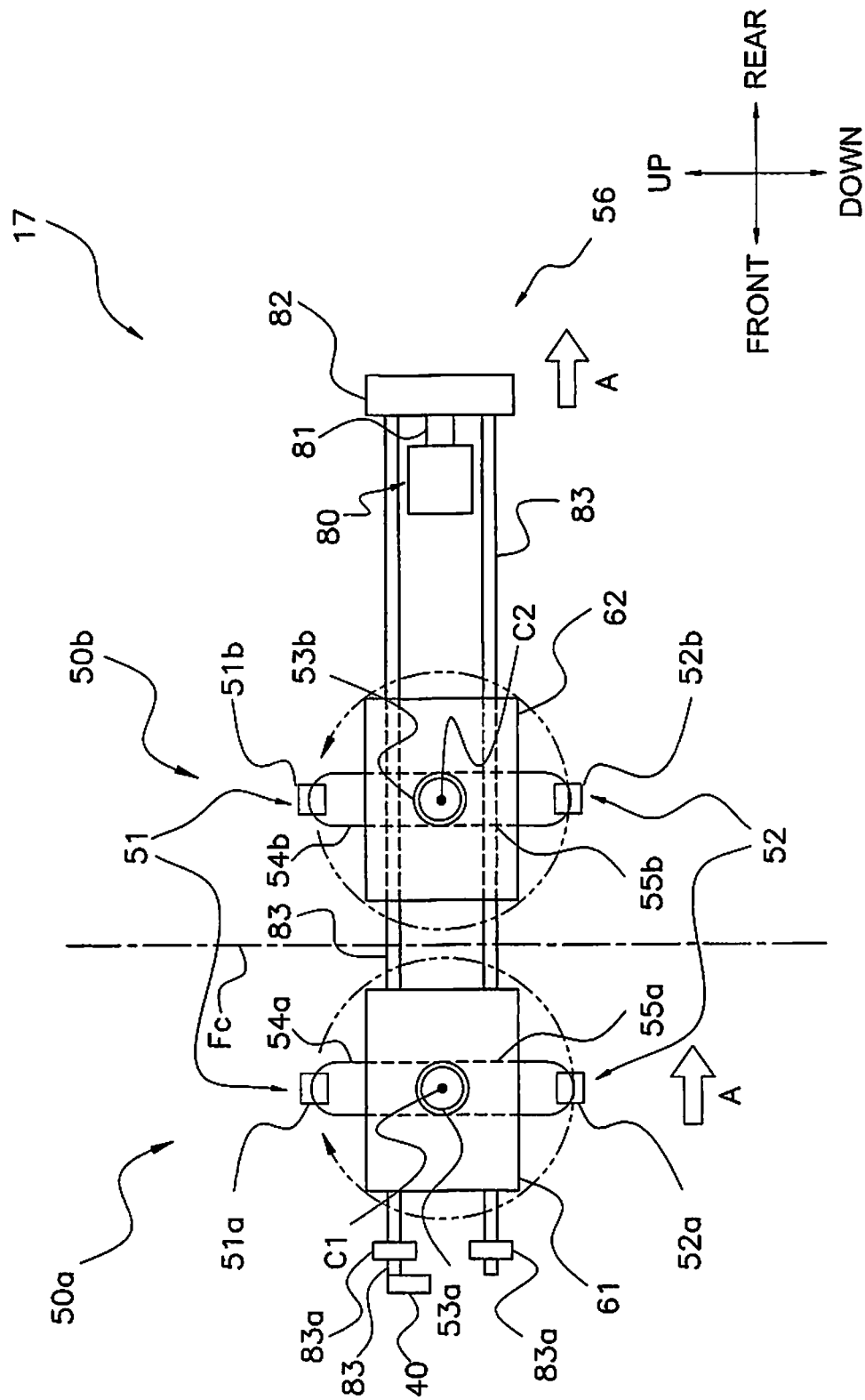
FIG. 4 is a side view, as seen from the right direction in FIG. 3, of the lateral sealing mechanism of the bag making and packaging unit according to FIG. 3.

The lateral sealing mechanism 17 has primarily a first rotating body 50a, a second rotating body 50b, and a pressurization mechanism 56 (see FIG. 4).

The first rotating body 50a is placed on the front side of the tubular film Fc (the left side in FIG. 4). The second rotating body 50b is placed on the back side of the tubular film Fc (the right side in FIG. 4). The pressurization mechanism 56, as described hereinafter, exerts pressure force on one set of sealing jaws 51a, 52a towards the other set of sealing jaws 51b, 52b, so that the tubular film Fc is sandwiched between the pair of sealing jaws 51 or the pair of sealing jaws 52 and laterally sealed by the pair of sealing jaws 51 or the pair of sealing jaws 52. Specifically, the pressurization mechanism 56 pushes the first rotating shaft 53a of the first rotating body 50a toward the second rotating shaft 53b of the second rotating body 50b (toward the rear), so that pressure force is exerted on one set of sealing jaws 51a, 52a towards the other set of sealing jaws 51b, 52b. In FIG. 4, the orientation in which the first rotating shaft 53a is pushed toward the second rotating shaft 53b is depicted by the arrow A. As is described hereinafter, a knife 72a as a fusion cutting member is provided (see FIG. 7) to one sealing jaw (the sealing jaws 51b, 52b) of each of the pairs of sealing jaws 51, 52. Due to the pressurization mechanism 56 exerting pressure force on the sealing jaws 51a, 52a towards the sealing jaws 51b, 52b, the knives 72a come into contact with laterally sealed portions of the tubular film Fc and fusion-cut the laterally sealed portions of the tubular film Fc.

(2-1-4-1) Rotating Bodies

The first rotating body 50a and the second rotating body 50b will be described in detail.

(2-1-4-1-1) First Rotating Body

The first rotating body 50a has primarily a first rotating shaft 53a, a pair of levers 54a, a pair of levers 55a, the sealing jaw 51a, and the sealing jaw 52a (see FIG. 4).

The first rotating shaft 53a is a rotating shaft of the first rotating body 50a, extending in the left-right direction. In a side view, the first rotating body 50a rotates about a rotational axis C1 using the first rotating shaft 53a as a rotating shaft (see FIG. 4).

The pair of levers 54a is connected near the longitudinal ends (near the left-right directional ends) of the first rotating shaft 53a. Each of the levers 54a extends from the first rotating shaft 53a in the radial direction of the first rotating shaft 53a. One of the levers 54a extends from the first rotating shaft 53a in the same direction and in parallel with the other lever 54a.

The pair of levers 55a is connected near the longitudinal ends (near the left-right directional ends) of the first rotating shaft 53a. Each of the levers 55a extends from the first rotating shaft 53a in the radial direction of the first rotating shaft 53a. One of the levers 55a extends from the first rotating shaft 53a in the same direction and in parallel with the other lever 55a.

In a side view, the lever 54a and the lever 55a that are connected near the right end of the first rotating shaft 53a extend in point symmetry about the rotational center C1 of the first rotating body 50a (see FIG. 4). In other words, in a side view, the lever 54a and the lever 55a that are connected near the right end of the first rotating shaft 53a extend in opposite directions each other from the rotational center C1 of the first rotating body 50a (see FIG. 4). In a side view, the lever 54a and the lever 55a that are connected near the left end of the first rotating shaft 53a also extend in point symmetry about the rotational center C1 of the first rotating body 50a. In other words, in a side view, the lever 54a and the lever 55a that are connected near the left end of the first rotating shaft 53a extend in opposite directions each other from the rotational center C1 of the first rotating body 50a.

The sealing jaw 51a constitutes one of the pair of sealing jaws 51. The sealing jaws 51 are an example of the sealing members. The sealing jaw 51a has a sealing surface 511a (see FIG. 7) in which the longitudinal direction thereof corresponds with the left-right direction.

The sealing jaw 51a functions as a pair together with the sealing jaw 51b described hereinafter, and seals the sealed portion of the tubular film Fc. More specifically, the sealing jaws 51 sandwich and laterally seal the sealed portion of the tubular film Fc in the left-right direction (see FIG. 7), using the sealing surface 511a of the sealing jaw 51a in which the longitudinal direction thereof corresponds with the left-right direction, and a sealing surface 511b of the hereinafter-described sealing jaw 51b in which the longitudinal direction thereof corresponds with the left-right direction.

Both ends of the sealing jaw 51a in the longitudinal direction (the left-right direction) of the sealing surface 511a are respectively connected to the ends of the levers 54a extending from the first rotating shaft 53a. Because the levers 54a are connected to the first rotating shaft 53a as described above, the sealing jaw 51a is supported by the first rotating shaft 53a at both ends in the longitudinal direction (the left-right direction) of the sealing surface 511a, via the pair of levers 54a.

The sealing jaw 52a constitutes one of the pair of sealing jaws 52. The sealing jaws 52 are an example of the sealing members. The sealing jaw 52a has a sealing surface (not shown) in which the longitudinal direction thereof corresponds with the left-right direction.

The sealing jaw 52a functions as a pair together with the sealing jaw 52b described hereinafter, and seals the sealed portion of the tubular film Fc. More specifically, the sealing jaws 52 sandwich and laterally seal the sealed portion of the tubular film Fc in the left-right direction, using the sealing surface of the sealing jaw 52a in which the longitudinal direction thereof corresponds with the left-right direction, and a sealing surface (not shown) of the hereinafter-described sealing jaw 52b in which the longitudinal direction thereof corresponds with the left-right direction.

Both ends of the sealing jaw 52a in the longitudinal direction (the left-right direction) of the sealing surface are respectively connected to the ends of the levers 55a extending from the first rotating shaft 53a. Because the levers 55a are connected to the first rotating shaft 53a as described above, the sealing jaw 52a is supported by the first rotating shaft 53a at both ends in the longitudinal direction (the left-right direction) of the sealing surface, via the pair of levers 55a. Because the levers 54a and the levers 55a extend in opposite directions each other from the rotational center C1 of the first rotating body 50a in a side view, the sealing jaw 52a is disposed in a position 180° away from the sealing jaw 51a about the rotational center C1 of the first rotating body 50a.

(2-1-4-1-2) Second Rotating Body

The second rotating body 50b has primarily the second rotating shaft 53b, a pair of levers 54b, a pair of levers 55b, the sealing jaw 51b, and the sealing jaw 52b (see FIG. 4).

The second rotating shaft 53b is a rotating shaft of the second rotating body 50b, extending in the left-right direction. In a side view, the second rotating body 50b rotates about a rotational center C2 using the second rotating shaft 53b as a rotating shaft (see FIG. 4).

The pair of levers 54b is connected near the longitudinal ends (near the left-right directional ends) of the second rotating shaft 53b. Each of the levers 54b extends from the second rotating shaft 53b in the radial direction of the second rotating shaft 53b. One of the levers 54b extends from the second rotating shaft 53b in the same direction and in parallel with the other lever 54b.

The pair of levers 55b is connected near the longitudinal ends (near the left-right directional ends) of the second rotating shaft 53b. Each of the levers 55b extends from the second rotating shaft 53b in the radial direction of the second rotating shaft 53b. One of the levers 55b extends from the second rotating shaft 53b in the same direction and in parallel with the other lever 55b.

In a side view, the lever 54b and the lever 55b that are connected near the right end of the second rotating shaft 53b extend in point symmetry about the rotational center C2 of the second rotating body 50b (see FIG. 4). In other words, in a side view, the lever 54b and the lever 55b that are connected near the right end of the second rotating shaft 53b extend in opposite directions each other from the rotational center C2 of the second rotating body 50b (see FIG. 4). In a side view, the lever 54b and the lever 55b that are connected near the left end of the second rotating shaft 53b also extend in point symmetry about the rotational center C2 of the second rotating body 50b. In other words, in a side view, the lever 54b and the lever 55b that are connected near the left end of the second rotating shaft 53b extend in opposite directions each other from the rotational center C2 of the second rotating body 50b.

The sealing jaw 51b constitutes one of the pair of sealing jaws 51. The sealing jaw 51b has a sealing surface 511b (see FIG. 7) in which the longitudinal direction thereof corresponds with the left-right direction. The sealing jaw 51b functions as a pair with the sealing jaw 51a as previously described, and seals the sealed portion of the tubular film Fc.

Both ends of the sealing jaw 51b in the longitudinal direction (the left-right direction) of the sealing surface 511b are respectively connected to the ends of the levers 54b extending from the second rotating shaft 53b. Because the levers 54b are connected to the second rotating shaft 53b as described above, the sealing jaw 51b is supported by the second rotating shaft 53b at both ends in the longitudinal direction (the left-right direction) of the sealing surface 511b, via the pair of levers 54b.

The sealing jaw 52b constitutes one of the pair of seating jaws 52. The sealing jaw 52b has a sealing surface (not shown) in which the longitudinal direction thereof corresponds with the left-right direction. The sealing jaw 52b functions as a pair with the sealing jaw 52a as previously described, and seals the sealed portion of the tubular film Fc.

Both ends of the sealing jaw 52b in the longitudinal direction (the left-right direction) of the sealing surface are respectively connected to the ends of the levers 55b extending from the second rotating shaft 53b. Because the levers 55b are connected to the second rotating shaft 53b as described above, the sealing jaw 52b is supported by the second rotating shaft 53b at both ends in the longitudinal direction (the left-right direction) of the sealing surface, via the pair of levers 55b. Because the levers 54b and the levers 55b extend in opposite directions each other from the rotational center C2 of the second rotating body 50b in a side view, the sealing jaw 52b is disposed in a position 180° away from the sealing jaw 51b about the rotational center C2 of the second rotating body 50b.

(2-1-4-1-3) Operation of First and Second Rotating Bodies

The first rotating shaft 53a is driven by a drive motor (not shown), whereby the first rotating body 50a is made to rotate about the rotational center C1 in a side view (see FIG. 5). The second rotating shaft 53b is driven by a drive motor (not shown), whereby the second rotating body 50b is made to rotate about the rotational center C2 in a side view (see FIG. 5). These configurations cause the sealing jaw 51a and the sealing jaw 52a to rotate in a circular orbit about the rotational center C1, and the sealing jaw 51b and the sealing jaw 52b to rotate in a circular orbit about the rotational center C2 (see FIG. 5). The first rotating body 50a, when viewed from the right side, is made to rotate clockwise about the rotational center C1 (see FIG. 5). In other words, the sealing jaw 51a and the sealing jaw 52a, when viewed from the right side, are made to rotate clockwise about the rotational center C1. The second rotating body 50b, when viewed from the right side, is made to rotate counterclockwise about the rotational center C2 (see FIG. 5). In other words, the sealing jaw 51b and the sealing jaw 52b, when viewed from the right side, are made to rotate counterclockwise about the rotational center C2.

The first rotating body 50a is supported at both ends in the lateral sealing direction (in the left-right direction) by horizontally moving plates 61 (see FIG. 4). More specifically, both ends in the left-right direction of the first rotating shaft 53a of the first rotating body 50a are supported by the horizontally moving plates 61. The second rotating body 50b is supported at both ends in the lateral sealing direction (in the left-right direction) by stationary plates 62 (see FIG. 4). More specifically, both ends in the left-right direction of the second rotating shaft 53b of the second rotating body 50b are supported by the stationary plates 62. The stationary plates 62 are secured to a frame 63 (see FIG. 6) of the bag making and packaging unit 3a.

The horizontally moving plates 61 are pushed toward the stationary plates 62 by the pressurization mechanism 56 (see arrow A in FIG. 4). As a result, the first rotating shaft 53a supported on the horizontally moving plates 61 is pushed by the pressurization mechanism 56 toward the second rotating shaft 53b supported on the stationary plates 62.

(2-1-4-2) Pressurization Mechanism

The pressurization mechanism 56 utilizes air pressure to exert pressure force on one sealing jaw 51a of the pair of sealing jaws 51 towards the other sealing jaw 51b. The pressurization mechanism 56 also exerts pressure force on one sealing jaw 52a of the pair of sealing jaws 52 towards the other sealing jaw 52b. Due to the pressurization mechanism 56 exerting pressure force on one set of sealing jaws 51a, 52a towards the other set of sealing jaws 51b, 52b, the pairs of sealing jaws 51, 52 sandwich and laterally seal the tubular film Fc therebetween. Also due to the pressurization mechanism 56 exerting pressure force on the sealing jaws 51a, 52a towards the sealing jaws 51b, 52b, the knives 72a fixed to the sealing jaws 51b, 52b come into contact with laterally sealed portions and fusion-cut the laterally sealed portions of the tubular film Fc. A detailed description follows.

Figure 8A:
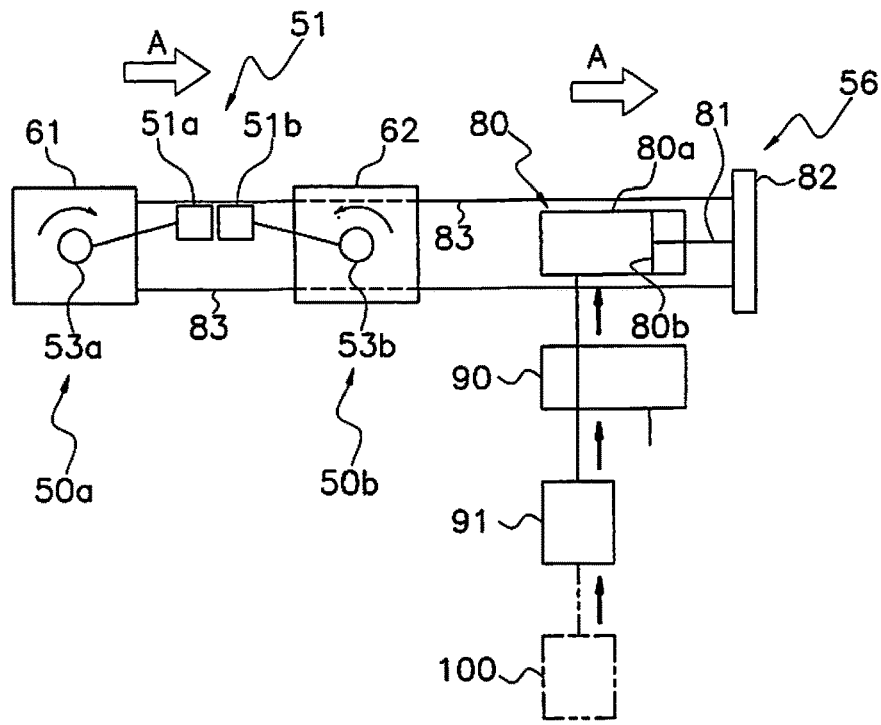
FIG. 8A is a schematic view of the pressurization mechanism according to FIG. 6. A state is depicted in which pressure force is being exerted by the pressurization mechanism on one sealing jaw towards another sealing jaw.
Figure 8B:
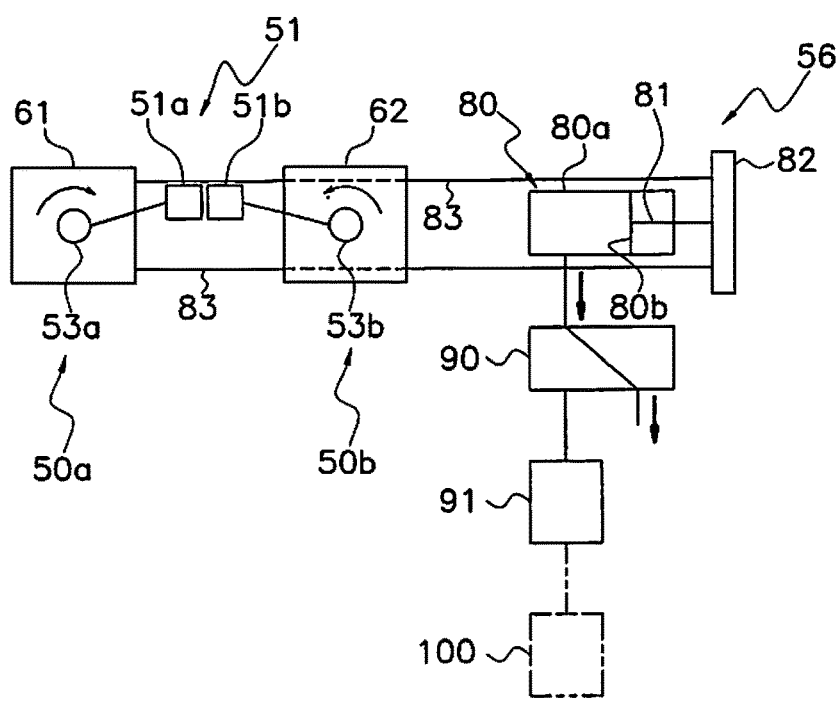
FIG. 8B is a schematic view of the pressurization mechanism according to FIG. 6. A state is depicted in which the pressure force on the sealing jaw is ceased to be exerted by the pressurization mechanism.

FIGS. 8A and 8B are schematic diagrams of the pressurization mechanism 56. In FIGS. 8A and 8B, the sealing jaw 52a supported on the first rotating shaft 53a and the sealing jaw 52b supported on the second rotating shaft 53b are not depicted. FIG. 8A depicts a state in which pressure force is exerted by the pressurization mechanism 56 on the sealing jaw 51a towards the sealing jaw 51b. FIG. 8B depicts a state in which the pressurization mechanism 56 ceases to exert pressure force on the sealing jaw 51a.

The pressurization mechanism 56 has primarily an air cylinder 80, a first linking rod 81, a linking plate 82, second linking rods 83, an electromagnetic valve 90, and an electropneumatic proportional valve 91, as shown in FIG. 8A.

The air cylinder 80 has a cylinder tube 80a to which compressed air is to be supplied, and a piston 80b disposed inside the cylinder tube 80a (see FIG. 8A).

Compressed air is supplied to the air cylinder 80 from an external compressed air source 100 (e.g., an air compressor), via the electromagnetic valve 90 and the electropneumatic proportional valve 91 in which the opening degrees can be adjusted. The electromagnetic valve 90 is a valve capable of switching between a first state in which compressed air flows from the compressed air source 100 to the cylinder tube 80a, and a second state in which the cylinder tube 80a is opened to the atmosphere (the interior of the cylinder tube 80a is communicated with the surrounding atmosphere).

Figure 6:
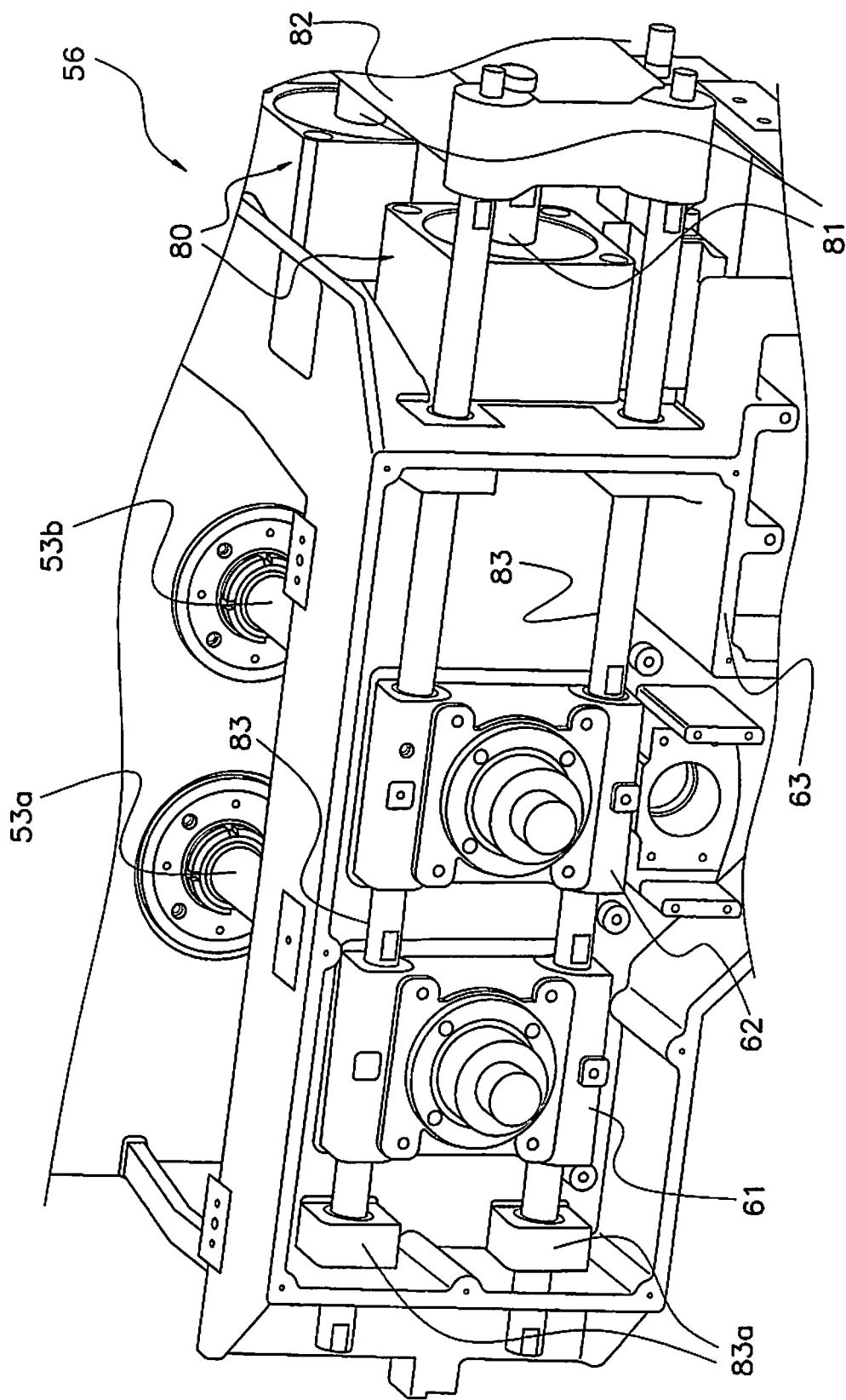
FIG. 6 is a perspective view, as seen from the right-rear direction in FIG. 3, of the pressurization mechanism of the lateral sealing mechanism according to FIG. 4.

The piston 80b disposed within the cylinder tube 80a is connected with the linking plate 82 via the first linking rod 81 which extends rearward from the air cylinder 80. The linking plate 82 is connected with the rear-side ends of the second linking rods 83. The second linking rods 83 are rod-shaped members connecting the linking plate 82 and the horizontally moving plates 61. The pressurization mechanism 56 has four second linking rods 83. Two of the second linking rods 83 extend forward in parallel from the upper-right corner vicinity and the lower-right corner vicinity of the linking plate 82, as shown in FIG. 6. Though not illustrated, the other two second linking rods 83 extend forward in parallel from the upper-left corner vicinity and the lower-left corner vicinity of the linking plate 82. The two second linking rods 83 that extend forward from the right-side end vicinities of the linking plate 82 are connected with the horizontally moving plate 61 disposed on the right side of the first rotating body 50a. The two second linking rods 83 that extend forward from the left-side end vicinities of the linking plate 82 are connected with the horizontally moving plate 61 disposed on the left side of the first rotating body 50a. The second linking rods 83 are not connected with the stationary plates 62, but the second linking rods 83 slidably extend through the stationary plates 62. The end (front-side end) vicinities of the second linking rods 83 on the side opposite the linking plate 82 are slidably supported by rod support members 83a (see FIG. 6) secured to the frame 63 of the bag making and packaging unit 3a. Because the second linking rods 83 are slidably supported by the rod support members 83a, the horizontally moving plates 61 connected with the second linking rods 83 are capable of moving toward or away from the stationary plates 62. In other words, the first rotating shaft 53a supported on the horizontally moving plates 61 is capable of moving toward or away from the second rotating shaft 53b supported on the stationary plates 62.

When the electromagnetic valve 90 is in the first state, compressed air is supplied into the cylinder tube 80a from the compressed air source 100, and the piston 80b inside the cylinder tube 80a is pushed rearward by the air pressure (see arrow A in FIG. 8A). The force by which the compressed air pushes the piston 80b rearward is transferred to the linking plate 82 via the first linking rod 81, and the linking plate 82 is pushed rearward as a result. The force acting on the linking plate 82 is transferred to the horizontally moving plates 61 via the second linking rods 83, and the horizontally moving plates 61 are pushed in a direction of moving closer to the stationary plates 62. The first rotating shaft 53a supported on the horizontally moving plates 61 is pushed in a direction of moving closer to the second rotating shaft 53b supported on the stationary plates 62. As a result, when the pair of sealing jaws 51 perform a lateral sealing, pressure force towards the sealing jaw 51b is exerted by the pressurization mechanism 56 on the sealing jaw 51a attached to the first rotating shaft 53a via the levers 54a. When the pair of sealing jaws 52 perform a lateral sealing, pressure force towards the sealing jaw 52b is exerted by the pressurization mechanism 56 on the sealing jaw 52a attached to the first rotating shaft 53a via the levers 55a. In this state, the pressure force applied to the sealing jaws 51a, 52a is large enough for the pairs of sealing jaws 51, 52 to sandwich and laterally seal the tubular film Fc therebetween, and for the knives 72a fixed to the sealing jaws 51b, 52b to fusion-cut the laterally sealed portions of the tubular film Fc.

When the tubular film Fc is laterally sealed and fusion-cut by the sealing jaws 51 or the sealing jaws 52, the first rotating shaft 53a moves slightly (by about several hundred microns) in a direction of moving toward or away from the second rotating shaft 53b, due to the balance between the pressure force and the force acting on the sealing jaws 51a, 52a from the sealing jaws 51b, 52b. As is described hereinafter, the rotary encoder 40 measures the relative movement amount of the first rotating shaft 53a with respect to the second rotating shaft 53b.

When the electromagnetic valve 90 is in the second state, the compressed air source 100 ceases to supply compressed air to the cylinder tube 80a and the cylinder tube 80a is opened to the atmosphere, whereby pressure force ceases to be exerted on the sealing jaw 51a and the sealing jaw 52a. Specifically, due to the cylinder tube 80a being opened to the atmosphere, the pressure inside the cylinder tube 80a is reduced to a pressure at which the tubular film Fc is not fusion-cut by the knives 72a fixed to the sealing jaw 51b and the sealing jaw 52b. The pressure inside the cylinder tube 80a at which the tubular film Fc is not fusion-cut by the knives 72a is measured at a time such as during installation of the bag making and packaging machine 3 or during maintenance.

The pressure inside the cylinder tube 80a is not reduced to atmospheric pressure even when the electromagnetic valve 90 is switched to the second state and the cylinder tube 80a is opened to the atmosphere. Therefore, the lateral sealing of the tubular film Fc is performed at least partially between the sealing jaw 51a and the sealing jaw 51b, or between the sealing jaw 52a and the sealing jaw 52b. Due to the pressure inside the cylinder tube 80a not being reduced to atmospheric pressure, the pressure inside the cylinder tube 80a can be returned to a pressure at which the tubular film Fc can be fusion-cut by the knives 72a in a relatively short time when the electromagnetic valve 90 is returned to the first state.

A pressurization mechanism control part 30a, described hereinafter, controls whether the pressurization mechanism 56 exerts pressure force, or ceases to exert pressure force, on the sealing jaws 51a, 52a towards the sealing jaws 51b, 52b by switching the state of the electromagnetic valve 90 between the first state and the second state.

(2-1-4-3) Sealing Action by Sealing Jaws

The sealing action by the sealing jaws 51 shall be described. More specifically, the lateral sealing of the tubular film Fc by the sealing jaws 51 and the separating of the laterally sealed bags B from the tubular film Fc, which take place during the sealing action by the sealing jaws 51, shall be described. Given here is a description of the sealing action of the sealing jaws 51 during a state in which the state of the electromagnetic valve 90 is switched to the first state by the pressurization mechanism control part 30a and the pressurization mechanism 56 exerts pressure force on the sealing jaw 51a towards the sealing jaw 51b.

Figure 7:
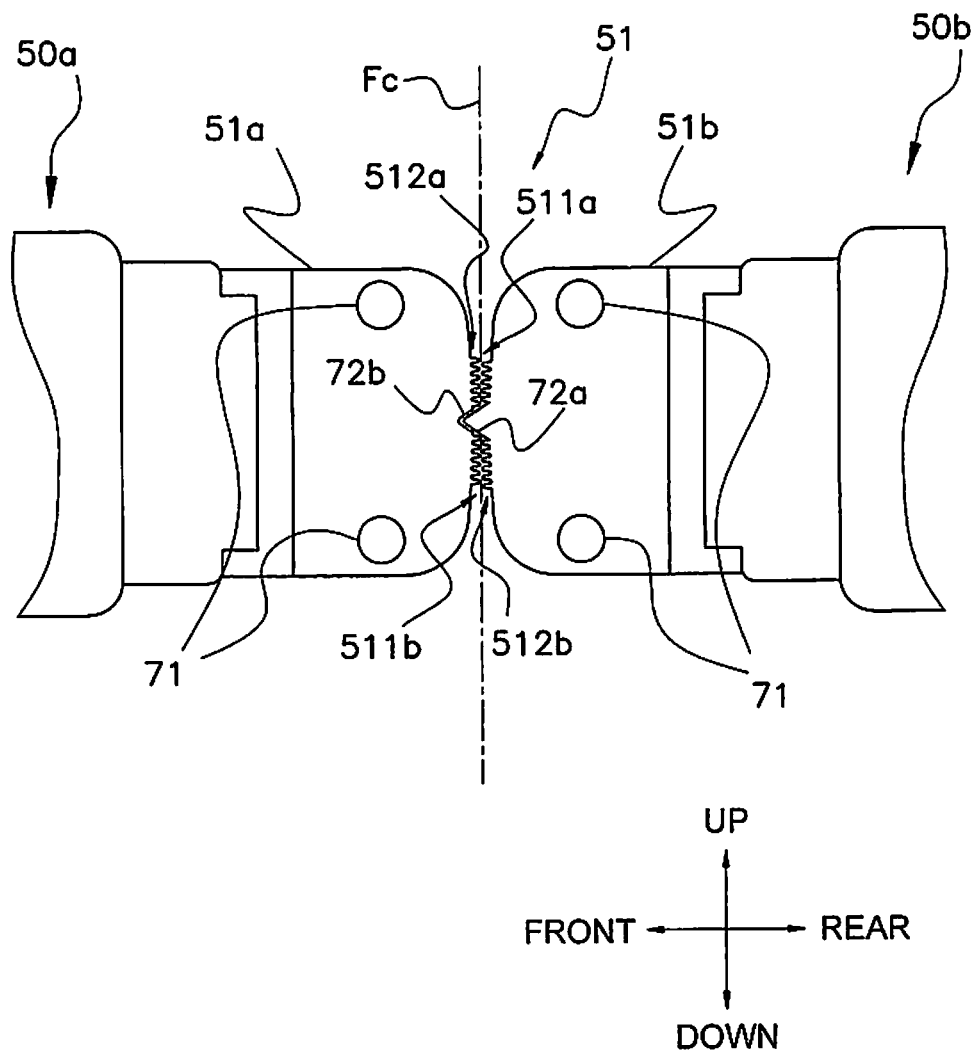
FIG. 7 is a side view, as seen from the right direction in FIG. 3, of the sealing jaws of the lateral sealing mechanism according to FIG. 4, in a state in which the sealing action (including fusion-cutting the film) is being performed.

The first rotating body 50*a* and the second rotating body 50*b* rotate (refer to the arrows shown with double-dotted lines in FIG. 5 for the rotational direction), and the first rotating shaft 53*a* is pushed toward the second rotating shaft 53*b* by the pressurization mechanism 56 (for the pushing direction, refer to the arrow A arranged below the first rotating body 50*a* in FIG. 5), whereby the sealing jaw 51*a* and the sealing jaw 51*b* sandwich and apply pressure to the downwardly conveyed tubular film Fc, between the sealing surface 511*a* of the sealing jaw 51*a* and the sealing surface 511*b* of the sealing jaw 51*b* (see FIG. 7). The sealing surface 511*a* and the sealing surface 511*b* respectively have serrations 512*a* and serrations 512*b* that mesh with each other as shown in FIG. 7. The sealing jaws 51 are designed so that the teeth of the serrations 512*a* in the sealing surface 511*a* and the teeth of the serrations 512*b* in the sealing surface 511*b* mesh together, sandwiching the tubular film Fc and applying pressure to the tubular film Fc. The sealing jaw 51*a* and the sealing jaw 51*b* have heaters 71 (see FIG. 7) provided in the interiors, and the sealing surface 511*a* and sealing surface 511*b* are heated by these heaters 71. When the sealing surface 511*a* and the sealing surface 511*b* are heated while sandwiching the tubular film Fc by the sealing surface 511*a* and the sealing surface 511*b*, the sealed portion of the tubular film Fc is heat-sealed. The downwardly conveyed tubular film Fc is heat-sealed in order from the downstream side (forward side in the conveying direction) toward the upstream side (rearward side in the conveying direction).

A knife 72*a* as a fusion cutting member for cutting the bag B away from the tubular film Fc is attached and fixed to the sealing jaw 51*b*, near the middle of the sealing surface 511*b* in the transverse direction (a direction orthogonal to the longitudinal direction of the sealing surface 511*b*). The knife 72*a* is attached so that the blade tip protrudes to the sealing jaw 51*a* during the sealing action by the sealing jaw 51*a* and the sealing jaw 51*b* (see FIG. 7). A groove 72*b*, with which the knife 72*a* protruding from the sealing jaw 51*b* toward the sealing jaw 51*a* meshes, is formed in the sealing jaw 51*a* near the middle of the sealing surface 511*a* in the transverse direction (direction orthogonal to the longitudinal direction of the sealing surface 511*a*). The knife 72*a*, which is formed into a helical blade, fusion-cuts the laterally sealed portion of the tubular film Fc from one-end side toward the other-end side in the lateral sealing direction (left-right direction). As a result, the laterally sealed bag B is cut away from the tubular film Fc.

Because the knife 72*a* is attached near the middle of the sealing surface 511*b* of the sealing jaw 51*b* in the transverse direction, the sealing jaws 51 perform the following actions in order as one sealing action:

(1) Laterally sealing the tubular film Fc.

(2) Cutting the laterally sealed bag B away from the tubular film Fc using the knife 72*a* on the upstream side with respect to the position laterally sealed in (1).

(3) Laterally sealing the tubular film Fc on the upstream side with respect to the position cut by the knife 72*a* in (2). It is noted that the timing with which lateral sealing or cutting of the tubular film Fc is performed by one set of actions (1) to (3) may partially overlap the timing with which another set of actions (1) to (3) is performed. In other words, cutting of the tubular film Fc in (2) may begin at a timing when lateral sealing in (1) has not completely finished, and lateral sealing in (3) may begin while cutting of the tubular film Fc in (2) has not finished.

Lateral sealing of the tubular film Fc by the sealing jaws 52 and cutting the laterally sealed bag B away from the tubular film Fc in the sealing jaws 52 are similar to those actions of the sealing jaws 51, and are therefore not described here.

(2-1-5) Rotary Encoder

The rotary encoder 40 (see FIG. 4) is secured to the frame 63 of the bag making and packaging unit 3*a*. The rotating shaft of the rotary encoder 40 is engaged with the forward-side (a side opposite to the side connected with the linking plate 82) end part of the second linking rod 83 so as to rotate when the second linking rod 83 moves forward and backward. Two rotary encoders 40 are provided. The rotating shaft of one rotary encoder 40 is engaged with the end part of the second linking rod 83 that, of the four second linking rods 83, is located on the upper right side. The rotating shaft of the other rotary encoder 40 is engaged with the end part of the second linking rod 83 that is located on the upper left side. The arrangement is not limited to this example, and the rotating shaft of one rotary encoder 40 may be engaged with the end part of the second linking rod 83 located on the lower right side, while the rotating shaft of the other rotary encoder 40 may be engaged with the end part of the second linking rod 83 located on the lower left side.

The rotary encoders 40 measure the forward and backward movement amount of the second linking rods 83 during the lateral sealing by measuring the rotational angles of the rotating shafts of the rotary encoders 40. The forward and backward movement amount of the second linking rods 83 is equal to the amount by which the first rotating shaft 53*a*, attached to the horizontally moving plates 61 connected to the second linking rods 83, moves relative to the second rotating shaft 53*b* attached to the stationary plates 62. In other words, the rotary encoders 40 measure the amount by which the first rotating shaft 53*a* moves relative to the second rotating shaft 53*b* in the direction by which the first rotating shaft 53*a* moves either toward or away from the second rotating shaft 53*b* during the lateral sealing, by measuring the rotational angles of the rotating shafts of the rotary encoders 40.

The movement amount of the second linking rods 83 connected to the horizontally moving plate 61 disposed on the right side of the first rotating shaft 53*a*, and the movement amount of the second linking rods 83 connected to the horizontally moving plate 61 disposed on the left side of the first rotating shaft 53*a*, are measured by the rotary encoders 40. In other words, the movement amount (right-side movement amount) of the first rotating shaft 53*a* on the side of the right-side end part relative to the second rotating shaft 53*b*, and the movement amount (left-side movement amount) of the first rotating shaft 53*a* on the side of the left-side end part relative to the second rotating shaft 53*b*, are measured by the rotary encoders 40. Therefore, the movement of either the left or right end part of the first rotating shaft 53*a*, toward or away from the second rotating shaft 53*b*, can be detected, and the amount of this movement can be measured.

(2-2) Film Supply Unit

The film supply unit 3*b* is a unit for supplying the film F in sheet form to the shaping mechanism 13 of the bag making and packaging unit 3*a*. The film supply unit 3*b* is provided adjacent to the bag making and packaging unit 3*a*. A roll around which the film F is rolled is set in the film supply unit 3*b*, and the film F is unreeled from this roll.

The film supply unit 3*b* is provided with a print position detection sensor 3*ba* for detecting whether any designs and/or letters have been printed (typed) in the appropriate position on the bag B (whether there are any abnormalities in the print position of the film F) when the bag B is produced from the film F by the bag making and packaging unit 3a. The print position detection sensor 3ba is, e.g., a mark sensor for detecting register marks printed on the film F, a sensor which images register marks, designs, and/or letters printed on the film F with a camera and detects the print position based on the captured image, or the like. However, the print position detection sensor 3ba is not limited to these types of sensors, and various sensors that can detect the print position on the film F may be used.

(2-3) Controller

The controller 30 is configured primarily from a CPU, a ROM, a RAM, and other storage media. The controller 30 is connected with the other components of the bag making and packaging machine 3. Specifically, the controller 30 is connected primarily with the pull-down belt mechanism 14, the vertical sealing mechanism 15, the lateral sealing mechanism 17 including the pressurization mechanism 56, the rotary encoder 40, the metal detector 18, and the film supply unit 3b (see FIG. 2). The controller 30 is also connected with the operation switches 4 and the touch panel display 5. By executing programs stored in the storage media, the controller 30 controls the bag making and packaging machine 3 based on commands and/or information inputted from the operation switches 4 and/or the touch panel display 5.

The controller 30 controls the bag making and packaging machine 3 so that the bag making and packaging machine 3 performs actions, for example, such as the following.

The controller 30 controls the film supply unit 3b so that the film F is supplied to the shaping mechanism 13. The controller 30 also controls the pull-down belt mechanism 14 so that the film F (the tubular film Fc) formed into a tubular shape by the shaping mechanism 13 is conveyed downward, and controls the vertical sealing mechanism 15 so that the seams of the conveyed tubular film Fc are sealed in the vertical direction. The controller 30 controls the lateral sealing mechanism 17 so that the downwardly conveyed tubular film Fc is sealed in the lateral direction in accordance with the timing at which the goods C discharged from the combination weighing machine 2 are discharged from the opening in the lower side of the tube 13b and the sealed bags B are cut away from the upstream tubular film Fc.

The controller 30 also has, as functioning parts, a pressurization mechanism control part 30a, a catching determination part 30b, and an abnormality signal receiver 30c.

(2-3-1) Pressurization Mechanism Control Part

The pressurization mechanism control part 30a controls the actions of the pressurization mechanism 56, or more specifically, the actions of the electromagnetic valve 90 and the electropneumatic proportional valve 91.

During normal times (while no errors such as are described hereinafter are occurring), the pressurization mechanism control part 30a controls the electromagnetic valve 90 to the first state (a state in which compressed air flows from the compressed air source 100 to the cylinder tube 80a). The pressurization mechanism control part 30a also controls the electropneumatic proportional valve 91 so that compressed air is supplied into the cylinder tube 80a at predetermined pressure. During normal times, the pressure inside the cylinder tube 80a is controlled to a pressure such that pressure force enabling the sealing jaws 51, 52 to laterally seal the tubular film Fc, and enabling the knives 72a fixed to the sealing jaws 51b, 52b to fusion-cut the tubular film Fc, can be exerted on the sealing jaws 51a, 52a.

In the event of an error, the pressurization mechanism control part 30a performs control for switching the electromagnetic valve 90 from the first state to the second state (a state in which air flows from the cylinder tube 80a into the atmosphere), and the pressurization mechanism 56 ceases to exert pressure force on the sealing jaws 51a, 52a towards the sealing jaws 51b, 52b.

The term "in the event of an error" used here means when errors pertaining to the film F or the goods C are occurring. In other words, based on error information pertaining to the film F or the goods C, the pressurization mechanism control part 30a causes the pressurization mechanism 56 to cease exerting pressure force on the sealing jaws 51a, 52a towards the sealing jaws 51b, 52b. The term "when errors pertaining to the film F or the goods C are occurring" means, specifically, times such as the following.

(1) The abnormality signal receiver 30c, described hereinafter, has received from the controller of the combination weighing machine 2 a signal indicating that the goods C of a weight outside of the predetermined weight range will be discharged from the combination weighing machine 2 into the bag making and packaging unit 3a (signal informing of a weight error in the goods C).

(2) The metal detector 18 has transmitted to the controller 30 a signal indicating that there is metal mixed in the goods C (signal informing of a metal-mixing error in the goods C).

(3) The catching determination part 30b, described hereinafter, has detected a catching error during lateral sealing of the tubular film Fc.

(4) The print position detection sensor 3ba of the film supply unit 3b has transmitted to the controller 30 a signal indicating that there is an abnormality in the print position of the film F (signal informing of a print position error in the film F).

The metal detector 18, the catching determination part 30b, and the print position detection sensor 3ba are examples of error information detection parts for detecting error information. The abnormality signal receiver 30c is an example of an error information receiver for receiving error information.

In the cases of (1) to (4) described above, the pressurization mechanism control part 30a performs control so that the electromagnetic valve 90 is switched from the first state to the second state, to cause the pressurization mechanism 56 cease exerting pressure force on the sealing jaws 51a, 52a towards the sealing jaws 51b, 52b, and the bag B having the error is discharged as a continuous package. When the bag B having no error is then discharged after the bag B having the error is discharged as a continuous package, the pressurization mechanism control part 30a performs control so that the electromagnetic valve 90 is switched back to the first state and the pressurization mechanism 56 exerts pressure force on the sealing jaws 51a, 52a.

The timing at which the electromagnetic valve 90 is switched from the first state to the second state, the time period during which the electromagnetic valve 90 is maintained in the second state, and other parameters are set in advance so that the tubular film Fc is not fusion-cut by the knives 72a while the error is occurring, but the tubular film Fc is fusion-cut by the knives 72a during a normal lateral sealing following the occurrence of error.

(2-3-2) Catching Determination Part

Based on the amount by which the first rotating shaft 53a moves relative to the second rotating shaft 53b as measured by the rotary encoders 40 (right-side movement amount and left-side movement amount), the catching determination part 30b determines whether or not any articles are caught in the sealed portion of the tubular film Fc when the sealing jaws 51, 52 laterally seal the film.

Specifically, the catching determination part 30b determines whether or not there is a catching error by making use of the matter that the first rotating shaft 53a moves further away from the second rotating shaft 53b when articles are caught in comparison with when articles are not been caught. More specifically, the catching determination part 30b determines whether there is a catching error in the sealed portion of the tubular film Fc by comparing the measured movement amount with a pre-measured movement amount for situations in which articles are not been caught.

Catching occurs in the sealed portion of the tubular film Fc when, e.g., the goods C get trapped in the sealed portion, and/or when cut residues of the tubular film Fc get trapped.

(2-3-3) Abnormality Signal Receiver

The abnormality signal receiver 30c receives a signal informing of a weight error in the goods C (signal informing that the goods C of a weight outside of the appropriate weight range will be discharged from the combination weighing machine 2), which is transmitted from the controller of the combination weighing machine 2. The pressurization mechanism control part 30a controls the pressurization mechanism 56 as described above based on the signal informing of the weight error in the goods C, received by the abnormality signal receiver 30c.

(3) Characteristics

The characteristics of the bag making and packaging machine 3 according to the present embodiment are described below.

For the sake of convenience in the description, the characteristics of the bag making and packaging machine 3 are described using the pair of sealing jaws 51 (the sealing jaws 51a, 51b), but the characteristics of the bag making and packaging machine 3 could be described in the same manner using the pair of sealing jaws 52.

(3-1)

The bag making and packaging machine 3 according to the present embodiment produces the bags B from the film F, and packages the goods C, which are packaged articles, inside the bags B. The bag making and packaging machine 3 is provided with the pair of sealing jaws 51, the knife 72a as the fusion cutting member, the pressurization mechanism 56, and the pressurization mechanism control part 30a. The pair of sealing jaws 51 laterally seals the tubular film Fc. The knife 72a, which is fixed to the sealing jaw 51b, fusion-cuts the laterally sealed portion of the tubular film Fc. The pressurization mechanism 56 exerts pressure force on one sealing jaw 51a toward the other sealing jaw 51b so that the pair of sealing jaws 51 sandwiches and laterally seals the tubular film Fc therebetween, the knife 72a comes into contact with the laterally sealed portion, and the laterally sealed portion is fusion-cut. The pressurization mechanism control part 30a causes the pressurization mechanism 56 to cease exerting pressure force based on the error information pertaining to the film F or the goods C.

In this embodiment, the exertion of pressure force on the sealing jaw 51a by the pressurization mechanism 56, which serves as the drive force of the fusion cutting by the knife 72a, is ceased based on error information pertaining to the film F or the goods C. Therefore, the bag B with an abnormality in the film F (i.e., the bag B itself) or in the goods C as packaged articles can be discharged as a continuous package from the bag making and packaging machine 3. As a result, the bags B with abnormalities can be easily discerned among the bags B discharged from the bag making and packaging machine 3.

(3-2)

In the bag making and packaging machine 3 according to the present embodiment, when the pressurization mechanism control part 30a causes the pressurization mechanism 56 to cease exerting pressure force, the sealing jaws 51 laterally seal the tubular film Fc and the knife 72a does not fusion-cut the laterally sealed portion.

In this embodiment, because the laterally sealed portion is not fusion-cut when the pressurization mechanism 56 ceases exerting pressure force on the sealing jaw 51a, the bag B with an abnormality can therefore be discharged as a continuous package from the bag making and packaging machine 3.

Particularly, in this embodiment, when the exertion of pressure force by the pressurization mechanism 56 is ceased, the pressure between the sealing jaws 51 is not reduced so much that the tubular film Fc would not be laterally sealed. It is therefore possible to quickly switch between a state in which the knife 72a cuts the laterally sealed portion of the tubular film Fc and the bags are discharged as a continuous package, and a state in which the knife 72a cuts the laterally sealed portion of the tubular film Fc in order to separate the bags B.

(3-3)

In the bag making and packaging machine 3 according to the present embodiment, the pressurization mechanism 56 includes the air cylinder 80 having the cylinder tube 80a to which compressed air is to be supplied. The pressurization mechanism control part 30a causes the pressurization mechanism 56 to cease exerting pressure force by opening the cylinder tube 80a to the atmosphere.

In this embodiment, it is possible to make the pressurization mechanism 56 to cease exerting pressure force in a short amount of time due to the cylinder tube 80a being opened to the atmosphere. Therefore, when the processing speed of the bag making and packaging machine 3 is relatively high (relatively large number of bags B are packaged per unit time), the bags B with abnormalities in the film F (i.e., in the bags B themselves) or in the goods C are easily discharged as a continuous package from the bag making and packaging machine 3.

The present invention is not limited to this arrangement and the pressurization mechanism control part 30a may cause the pressurization mechanism 56 to cease exerting pressure force by, e.g., controlling the electropneumatic proportional valve 91. However, it is preferable to use the electromagnetic valve 90 to open the compressed air in the cylinder tube 80a to the atmosphere to cause the pressurization mechanism 56 to cease exerting pressure force in a short amount of time.

(3-4)

In the bag making and packaging machine 3 according to the present embodiment, the error information used when the pressurization mechanism control part 30a causes the pressurization mechanism 56 to cease exerting pressure force includes information pertaining to weight errors in the goods C, metal-mixing errors in the goods C, catching errors during the lateral sealing of the tubular film Fc, and print position errors in the film F.

In this embodiment, when the errors described above occur in the film F or the goods C, the bags B with abnormalities can be discharged as a continuous package from the bag making and packaging machine 3.

In the bag making and packaging machine 3, the pressurization mechanism control part 30a does not need to cause the pressurization mechanism 56 to cease exerting pressure force based on all of the error information described above. For example, the pressurization mechanism control part 30a may cause the pressurization mechanism 56 to cease exerting pressure force based on some of the error information described above.

(3-5)

The bag making and packaging machine 3 according to the present embodiment is provided with the abnormality signal receiver 30c as an error information receiver for receiving error information.

The bags B with abnormalities can thereby be discharged as a continuous package from the bag making and packaging machine 3 using weight error information of the goods C from the combination weighing machine 2 outside of the bag making and packaging machine 3.

(3-6)

The bag making and packaging machine 3 according to the present embodiment is provided with the metal detector 18, the print position detection sensor 3ba, and the catching determination part 30b as error information detectors for detecting error information.

Abnormalities in the film F and/or the goods C can thereby be detected, and the bags B with abnormalities in the bags B themselves or in the goods C therein can be discharged as a continuous package from the bag making and packaging machine 3.

(4) Modifications

Modifications of the present embodiment are indicated below. The modifications may be combined as appropriate as long as they do not contradict each other.

(4-1) Modification A

In the above embodiment, the knives 72a are fixed to the sealing jaws 51b, 52b and pressure force is exerted by the pressurization mechanism 56 on the sealing jaws 51a, 52a, but the present invention is not limited to this arrangement. For example, the knives 72a may be fixed to the sealing jaws 51a, 52a and pressure force may be exerted by the pressurization mechanism 56 on the sealing jaws 51b, 52b. Another possible example is that pressure force may be exerted by the pressurization mechanism 56 on the sealing jaws 51b, 52b to which the knives 72a are fixed. Another possible example is that the knives 72a may be fixed to the sealing jaws 51a, 52a to which pressure force is exerted by the pressurization mechanism 56.

(4-2) Modification B

In the above embodiment, the pressurization mechanism 56 drives the air cylinder 80 using compressed air, but the present invention is not limited to this arrangement. For example, the pressurization mechanism 56 may be a mechanism driven by hydraulic pressure, or it may be a mechanism driven by a motor in the manner of an electric ball screw.

(4-3) Modification C

In the above embodiment, the bag making and packaging machine 3 has the metal detector 18, but the present invention is not limited to this arrangement, and the combination weighing machine 2 may have the metal detector 18. In this case, when the metal detector 18 detects that metal is mixed in the goods C, error information may be transmitted to the abnormality signal receiver 30c from, e.g., the controller of the combination weighing machine 2.

(4-4) Modification D

In the above embodiment, the cylinder tube 80a is opened to the atmosphere by the electromagnetic valve 90, but the present invention is not limited to this arrangement. For example, a vacuum pump for drawing air in the cylinder tube 80a may be provided and the pressurization mechanism control part 30a may start up the vacuum pump based on the error information, whereby air may be exhausted from the cylinder tube 80a. The pressurization mechanism 56 can thereby cease to exert pressure force on the sealing jaws 51a, 52a towards the sealing jaws 51b, 52b sooner than the cylinder tube 80a is opened to the atmosphere.

(4-5) Modification E

In the above embodiment, the pressure in the cylinder tube 80a is reduced to pressure at which the tubular film Fc is not fusion-cut by the knives 72a, but the present invention is not limited to this arrangement. For example, the pressure in the cylinder tube 80a may be reduced to atmospheric pressure, or to pressure lower than atmospheric pressure by using a vacuum pump or the like, as in Modification D. Fusion-cutting by the knives 72a can thereby be more reliably prevented. In this case, the tubular film Fc would be mostly not laterally sealed by the sealing jaws 51 or the sealing jaws 52.

To quickly switch between a state in which the knives 72a does not cut the laterally sealed portions of the tubular film Fc for discharging as a continuous package, and a state in which the knives 72a cut the laterally sealed portions of the tubular film Fc in order to separate the bags B, the pressure in the cylinder tube 80a, when an error occurs, is preferably reduced to pressure higher than atmospheric pressure, at which the tubular film Fc is not fusion-cut.

(4-6) Modification F

In the lateral sealing mechanism 17 according to the above embodiment, the tubular film Fc is sandwiched and laterally sealed, alternately by the sealing jaw 51a and the sealing jaw 51b, and by the sealing jaw 52a and the sealing jaw 52b, but the present invention is not limited to this arrangement.

For example, in the bag making and packaging machine 3, the sealing jaw 51a alone may be provided to the first rotating body 50a, the sealing jaw 51b alone may be provided to the second rotating body 50b, and lateral sealing may be performed using only the sealing jaws 51. Additionally, for example, the bag making and packaging machine 3 may have three or more pairs of sealing jaws, and lateral sealing of the tubular film Fc may be performed using these pairs of sealing jaws alternately.

(4-7) Modification G

In the above embodiment, the pressurization mechanism control part 30a causes the pressurization mechanism 56 to cease exerting pressure force on the sealing jaws 51a, 52a towards the sealing jaws 51b, 52b based on the information pertaining to weight errors in the goods C, metal-mixing errors in the goods C, catching errors during the lateral sealing of the tubular film Fc, and print errors in the film F, which are information pertaining to the film F or the goods C, but the present invention is not limited to this arrangement.

Figure 9:
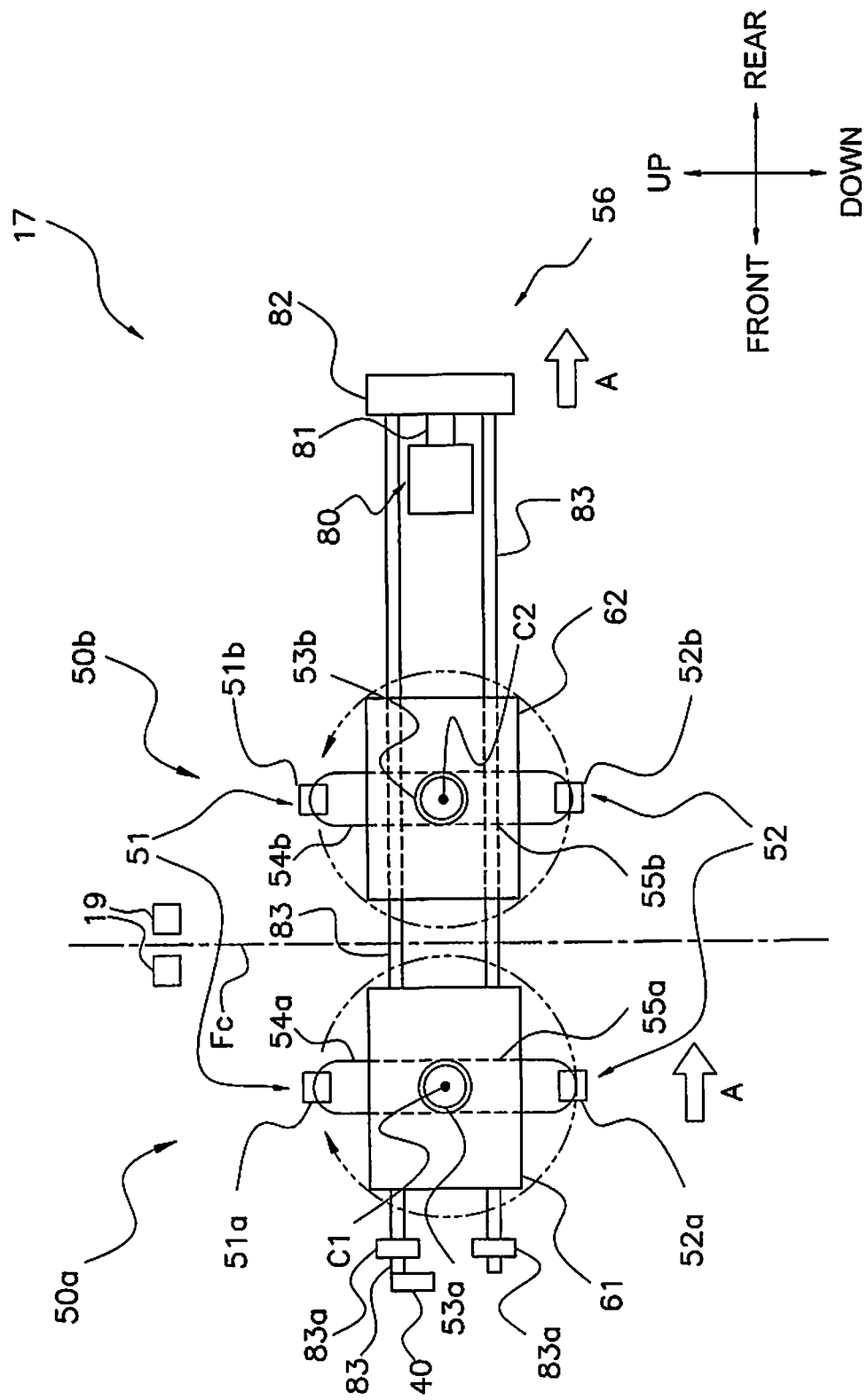
FIG. 9 is a side view, as seen from the right direction in FIG. 3, of the lateral sealing mechanism of the bag making and packaging machine having a film detection sensor, according to Modification G.

For example, the bag making and packaging machine 3 may have a film detection sensor 19 as an error information detector above the lateral sealing mechanism 17, as shown in FIG. 9. The film detection sensor 19 is, e.g., a photoelectric sensor. The film detection sensor 19 detects whether the tubular film Fc is present (whether no abnormality errors occurs in supplying of the tubular film Fc). The pressurization mechanism control part 30a may cause the pressurization mechanism 56 to exert pressure force on the sealing jaws 51a, 52a towards the sealing jaws 51b, 52b based on a signal transmitted by the film detection sensor 19, for informing of abnormality errors in supplying of the tubular film Fc, either instead of the error information in the above embodiment or in addition to the error information in the above embodiment.

This configuration makes it possible to prevent a problem such that the sealing jaws 51, 52, when the tubular film Fc is unintentionally cut and is wound around a film-drawing mechanism (not shown) disposed in proximity to the lateral sealing mechanism 17, sandwiches and damages the film-drawing mechanism around which the tubular film Fc is wound. The film-drawing mechanism is a mechanism for removing fragments and the like of the goods C adhering to laterally sealed portions of the tubular film Fc, and minimizing catching in the laterally sealed portions.

INDUSTRIAL APPLICABILITY

The bag making and packaging machine according to the present invention is a bag making and packaging machine in which a cutter fixed to sealing members cut laterally sealed portions using pressure force with which a pair of sealing members sandwiches a film during lateral sealing in order to separate bags, the bag making and packaging machine being useful as a machine that can discharge bags as a continuous package.

What is claimed is:

1. A bag making and packaging machine configured to produce bags from a film and package previously packaged articles inside the bags, the bag making and packaging machine comprising:
    a pair of sealing members configured to laterally seal the film, each sealing member has a corresponding sealing surface;
    a first rotating body having a first rotating shaft which supports and rotates one of the pair of sealing members;
    a second rotating body having a second rotating shaft which supports and rotates the other one of the pair of sealing members, the first rotating shaft being configured to move toward or away from the second rotating shaft;
    a fusion cutting member configured to fusion-cut a laterally sealed portion of the film, the fusion cutting member being non-movably fixed to the sealing surface of one of the sealing members;
    a pressurization mechanism configured to exert pressure force on the first rotating shaft such that the one of the sealing members and the first rotating shaft move towards the other of the sealing members with the sealing surfaces of the pair of sealing members sandwiching and laterally sealing the film therebetween, and the fusion cutting member coming into contact with the laterally sealed portion and fusion-cutting the laterally sealed portion such that the second rotating shaft remains stationary while the pressure force moves the first rotating shaft toward and away from the second rotating shaft; and
    a control part configured to cause the pressurization mechanism to cease exerting pressure force in response to receiving error information pertaining to the film or the packaged articles identifying a bag having an error, such that the pair of sealing members and the fusion cutter member are not operated to seal the film and fusion cut the laterally sealed portion when the control part causes the pressurization mechanism to cease exerting pressure force, the control part further controlling movement of the bag having the error to continue past the pair of sealing members and after the bag having the error has passed the pair of sealing members, the control part resumes causing the pressurization mechanism to exerting pressure force operating the pair of sealing members and the fusion cutter member.

2. The bag making and packaging machine according to claim 1, wherein
    the pressurization mechanism includes an air cylinder having a cylinder tube to which compressed air is to be supplied; and
    the control part is configured to cause the pressurization mechanism to cease exerting pressure force by opening the cylinder tube to the atmosphere.

3. The bag making and packaging machine according to claim 1, wherein
    the error information includes information pertaining to at least one of the following: weight errors in the packaged articles, metal-mixing errors in the packaged articles, catching errors during lateral sealing of the film, print position errors on the film, and abnormality errors in supplying of the film.

4. The bag making and packaging machine according to claim 1, further comprising:
    an error information receiver configured to receive the error information.

5. The bag making and packaging machine according to claim 1, further comprising:
    an error information detector configured to detect the error information.

* * * * *